United States Patent [19]

Largman et al.

[11] 4,403,052

[45] Sep. 6, 1983

[54] INJECTION MOLDABLE POLY(ETHYLENE TEREPHTHALATE)

[75] Inventors: Theodore Largman, Morristown; Bruce Van Buskirk, Randolph; Shaul M. Aharoni, Morris Plains, all of N.J.; Ian C. Twilley, Chester, Va.

[73] Assignee: Allied Corporation, Morris Township, Morris County, N.J.

[21] Appl. No.: 412,473

[22] Filed: Aug. 30, 1982

[51] Int. Cl.$^3$ .......................... C08K 3/08; C08K 3/16; C08K 3/34

[52] U.S. Cl. .................................... 524/80; 524/401; 524/414; 524/439; 524/462; 524/494

[58] Field of Search .............. 524/401, 414, 439, 462, 524/395, 80, 494

[56] References Cited

U.S. PATENT DOCUMENTS

| | | | |
|---|---|---|---|
| 3,883,475 | 5/1975 | Racky et al. | 524/414 |
| 4,185,044 | 1/1980 | Tacke et al. | 525/1 |
| 4,187,207 | 2/1980 | Cerny et al. | 524/414 |
| 4,193,907 | 3/1980 | Tacke et al. | 260/37 N |
| 4,210,630 | 7/1980 | Dany et al. | 423/265 |
| 4,327,207 | 4/1982 | Lazarus | 525/439 |

FOREIGN PATENT DOCUMENTS

| | | | |
|---|---|---|---|
| 54-132651 | 10/1979 | Japan | 524/401 |
| 56-6135543 | 10/1981 | Japan | 524/401 |

Primary Examiner—John Kight, III
Assistant Examiner—Kriellion Morgan
Attorney, Agent, or Firm—Marianne M. Kriman; Alan M. Doernberg; Gerhard H. Fuchs

[57] ABSTRACT

A flame retarded, injection moldable, saturated, linear polyester composition contains red phosphorus as flame retardant and a metal iodide as phosphine suppressing agent. The metal is one of the groups 1a and 2b of the periodic table of elements with potassium iodide being the most preferred.

The phosphine evolution of a poly(ethylene terephthalate) molding composition containing 4% red phosphorus as flame retardant is reduced to 0.3 ppm at the die and to 1.0 ppm in storage by the addition of 0.6% of potassium iodide.

9 Claims, No Drawings

INJECTION MOLDABLE POLY(ETHYLENE TEREPHTHALATE)

FIELD OF THE INVENTION

This invention relates to polyester compositions which include red phosphorus as a flame retarding agent having reduced phosphine evolution.

More specifically, the invention relates to novel phosphine suppressants and to their use in polyester compositions which include red phosphorus as a flame retardant.

BACKGROUND OF THE INVENTION

The addition of red phosphorus as a flame retardant has been recommended for a variety of plastic materials. For example, Largman and Stone, in U.S. Pat. No. 3,847,861, disclose that the incorporation of red phosphorus into filled or unfilled polyesters, as for example poly(ethylene terephthalate), provides a polymer having good physical properties and flame retardance. Similarly, Largman and co-workers in U.S. Pat. Nos. 3,086,488 and 3,882,070 disclose that polyamides, such as Nylon 6 and Nylon 66, are flame retarded by red phosphorus. Red phosphorus has also been reported as a flame retardant in other polymeric materials, as for example, polyolefins (U.S. Pat. No. 3,931,101); polyphenylene oxides (U.S. Pat. Nos. 3,663,054 and 3,974,235); polyacetates (U.S. Pat. No. 3,884,867); ABS Resins (Canadian Pat. No. 846,892); polycarbonates (Japan Patent application Nos. 73/85,634 and 75/113,475); poly(chlorostyrene; polyacrylates (U.S. Pat. No. 3,125,553); vinyl polymers (U.S. Pat. No. 3,551,379); natural synthetic elastomers (U.S. Pat. No. 3,597,385 and S. Africa Pat. No. 700,200); epoxy resins (U.S. Pat. No. 3,375,135); polyurethane (U.S. Pat. No. 3,763,057); and polyimides (German Pat. No. 2,610,306).

While red phosphorus is very effective as a flame retardant for such polymeric materials, its use results in adverse effects, which in some cases seriously limits its usefulness. One extremely serious disadvantage is its tendency to form phosphine at elevated temperatures which usually accompany the processing of polymeric materials; and by reaction with atmospheric humidity. Phosphine is spontaneously flammable, is highly toxic by inhalation and is a strong irritant. Human tolerance levels as designated by the U.S. Occupational Safety and Health Administration (OSHA) are 0.3 ppm in air or less, and as disclosed in U.S. Pat. No. 3,883,475 amounts of 400 ppm or more are dangerous to life. This problem is especially critical if high temperatures are employed in polymer fabricating processes, and if a polymer made flame proof by red phosphorus is maintained or shipped in closed containers since in such instances these concentration levels may be considerably exceeded.

Various methods have been reported in the literature for minimizing phosphine evolution. One such method which is described in U.S. Pat. Nos. 4,210,630 and 2,035,953, involves the precipitation of metal hydroxides upon the outer surface of red phosphorus particles. These procedures suffer from the disadvantage that useful hydroxide salts are often expensive. Adverse effects also include poor filterability of the phosphorus containing suspension, and in an unsatisfactory stability of the red phosphorus treated therewith.

Another attempt to avoid phosphine formation consists in the encapsulation of the phosphorus particles, as recommended in German Pat. Nos. 2,734,103 and 2,754,491. This method however is expensive and does not work well by itself requiring the use of a combination of phosphine suppressing agents. U.S. Pat. Nos. 3,883,475 and 4,187,207 disclose the use of so-called phosphine traps, in which such compounds as cupric oxide are employed to fix or trap any phosphine produced. Cupric oxide considerably reduces the amount of phosphine released into the atmosphere but it accelerates the oxidation rate of red phosphorus. This results in the formation of phosphorus derived acids which have a deleterious effect upon the physical properties of the polymer substrate. As is mentioned in European Pat. No. 6549, small quantities of acids of one-to five-valent phosphorus are also formed when red phosphorus-containing polymers are processed at high temperature in contact with oxygen. During die casting or injection molding, these compounds accummulate at the surface of the plastic articles produced and reduce their resistance to current leakage making them less useful for electrical or electronic applications.

It has now been discovered that metal iodides serve as effective phosphine suppressants while at the same time reducing the oxidation of phosphorus to its acid derivatives. It is the purpose of this invention to provide a thermoplastic composition which offers the excellent flame retardance produced by the addition of red phosphorus while avoiding the deleterious side effects of phosphorus addition.

SUMMARY OF THE INVENTION

This invention provides an improved, flame retarded polymer composition comprising:
 a. a saturated linear polyester of an aromatic dicarboxylic acid and an aliphatic or cycloaliphatic diol,
 b. red phosphorus as a flame retardant and
 c. an effective amount of a metal iodide as phosphine suppressant.

The polyester component of this composition comprises polyesters of benzene based dicarboxylic acids with aliphatic or cycloaliphatic diols having from two to eight carbon atoms. The preferred polyester is poly(ethylene terephthalate) (PET).

A group of metal iodides comprising sodium iodie, lithium iodide, zinc iodide and potassium iodide were found to be effective phosphine suppressants without causing the undesirable side effects of the phosphine traps proposed in the prior art. Potassium iodide is the most preferred for the purpose of this invention.

DETAILED DESCRIPTION OF THE INVENTION

The composition of this invention includes a linear saturated polyester such as the condensation product of a benzene based aromatic dicarboxylic acid having from about 8 to about 14 carbon atoms and an aliphatic or cycloaliphatic diol.

Examples of dicarboxylic acids of choice are terephthalic acid and isophthalic acid. Examples of diols of choice are aliphatic diols having from about 2 to about 5 carbon atoms, such as ethanediol, 1,4-butanediol, 1,3-propanediol and the like; and cycloaliphatic diols such as 1,4-cyclohexanediol, 1,4-cyclohexanedimethanol and the like. Among these polyesters of choice poly(ethylene terephthalate) is the most preferred. The polyester component of the composition may also be a mixture or cocondensate of the above given polymers or may contain minor amounts, up to 5%, of other comonomers such as neopentyldiol, diethylenediol, glutaric acid or adipic acid.

The composition of this invention includes "red phosphorus" as a flame retarding agent. As used herein, "red phosphorus" refers to various colored allotropic varieties of phosphorus (namely red, violet or black phosphorus). Procedures and methods of using red phosphorus as a flame retardant for polymeric materials are well known in the art and will not be described herein in detail. Such methods and procedures are set forth in detail in Kuryla, W. C., and Papa, A. J., "Flame Retardancy of Polymeric Materials," pp. 113–176 Vol. 5 Marcel Dekker Inc. (1978), and references cited therein.

The composition of this invention includes an "effective amount" of metal iodide as phosphine suppressant. As used herein, an "effective amount" is an amount sufficient to suppress the evolution of phosphine into the atmosphere to the extent required. As shown in the examples 1 through 7, all the iodides used in our experiments cause a substantial decrease in the liberation of phosphine during heat processing of the polymer composition. The experimental data seem to indicate that the metal ion combined in the iodide has little influence in the phosphine suppressing qualities of the compounds. However, from the standpoint of their compatibility with poly(ethylene terephthalate), the potassium iodide was found to be more soluble, less hygroscopic and more conservative of the stability of PET. This invention comprises an injection molding grade PET composition including red phosphorus and an amount of potassium iodide such that the phosphine evolved during heat processing of the composition is equal to or less than 0.3 parts per million.

The amount of metal iodide in the composition may be selected between about 0.1% and about 2% by weight of the total weight of the composition, the preferred range being between about 0.5 and about 1.5%.

As is shown in the examples, the phosphine suppressing effect increases with increase of the amount of iodide in the composition. The actual quantity of metal iodide used depends on the metal ion, on the nature of the polyester component, on the level of phosphine suppression required and on the amount of phosphorus present in the composition.

In the working examples given hereinafter, commercial grade, crystalline metal iodides were used as phosphine suppressants. The grade of the salts is not critical and the presence of up to ten weight percent of inert impurities based on the total weight of metal iodide do not adversely affect the physical and chemical properties of the polymeric composition.

In addition to the essential components described above, the composition may include various optional additives commonly employed in polymer compositions such as fillers, plasticizers, impact modifiers, chain extenders, lubricants, nucleating agents, mold release agents, antioxidants, antistatic agents, colorants, ultraviolet light stabilizers, additional fire retardants and/or synergists therefor.

Any suitable filler or reinforcing agent can be used. The fillers may optionally be treated with various coupling agents or adhesion promotors as is known to those skilled in the art. Examples of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention. There is up to 150% by weight of the poly(ethylene terephthalate) of filler, and preferably about 30% to about 90% by weight of the poly(ethylene terephthalate) of filler. The most preferred fillers are glass fibers.

The plasticizers which can be used with the composition of the present invention are of the type known in the art which can be used with linear saturated polyester molding compositions. A nonlimiting group of plasticizers which can be used are found in Dutch Patents NL 79-01605 and NL 79-01609. The plasticizers disclosed are organic esters. The organic esters can be the product of an aromatic carboxylic acid of 7–11 carbon atoms containing at least one carboxyl group per aromatic nucleus, and an alcohol selected from those of the formula $HOCH_{(3-x)}R'_x$ wherein x is 1, 2 or 3 and $R'$ is a hydrocarbon radical of 2–15 carbon atoms (preferably 2–10 carbon atoms) or those of the formula $HO(R'O)_yR'''$ wherein y is a cardinal number between 1 and 8, $R''$ is a hydrocarbon radical of 2–15 carbon atoms (preferably 2–8 carbon atoms) and $R'''$ is —H or a hydrocarbon radical of 2–20 carbon atoms (preferably 2–12 carbon atoms). The plasticizer used can also be the product of an aliphatic carboxylic acid of 1 to 20 carbon atoms containing 1 to 3 carboxyl groups, and an alcohol of the formula $HO(R''O)_yR'''$ wherein $R''$, $R'''$ and y are defined above. Further plasticizers that can be used include the following: organic ketones of the formula

organic sulfones $R_2SO_2$; organic nitriles of the formula $RCN$; and organic amides of the formula

wherein R is a hydrocarbyl group of 1–25 carbons, and $R'$ is a hydrogen or hydrocarbyl group of 1–25 carbon atoms. A preferred aliphatic plasticizer is dioctyl alipate, and a preferred aromatic plasticizer is neopentyl glycol dibenzoate. Other aromatic plasticizers which can be used include: triethylene glycol dibenzoate, glyceryl tribenzoate, trimethylolethane tribenzoate, and pentaerythritol tetrabenzoate.

The quantity of plasticizer employed can be varied widely. In the present invention up to about 15 weight percent of plasticizer by weight of the polyester can be used. Preferably, there is between about 2% and 10% based on the weight of the poly(ethylene terephthalate) of plasticizer, and most preferably there is between about 2% and about 6% of plasticizer based on the weight of the poly(ethylene terephthalate).

The molding composition of this invention will preferably include an impact modifier. The type of modifier employed is not critical and can be varied widely as desired. Preferably, ionic co-polymers of an $\alpha,\beta$-unsaturated olefin such as ethylene, propylene and the like, and an $\alpha,\beta$-unsaturated carboxylic acid such as acrylic acid, methacrylic acid and the like, and in which all or a portion of the pendant carboxyl groups have been neutralized with univalent to trivalent metal cations are employed as impact modifiers. Included within the scope of the aforementioned generic description are such ionic copolymers as ethylene/acrylic acid Na+ ionic copolymer, ethylene/methacrylic acid/Na+ ionic copolymer, and the like. A particularly preferred impact modifier, is an ionic copolymer of ethylene/methacrylic acid/Na$^{30}$, which is marketed by DuPont Corporation of Wilmington, Del. under the trademark Surlyn ®. The composition will include up to about 2 to about 6 weight percent of the impact modifier based on the total weight of the polyester.

The polyester based compositions of this invention may also include a polyepoxide which functions as a chain extender and helps to compensate for polyester chains which are broken by hydrolysis. Epoxy resins which can be used include an epoxy formed from bisphenol-A and glycidyl ether, or polyepoxides obtained by reacting orthocresol novolac and epichlorohydrin. Preferred polyepoxides are epoxy cresol novolac resins which are commercially available under the trade designation ECN 1245, 1273 and 1299 from Ciba-Geigy Corporation. Preferably, there is up to about 3 percent and more preferably 0.1% to about 0.5% weight percent of polyepoxide based on the total weight of the polyester component.

The polymeric composition of this invention can be further modified by the addition of one or more nucleating agents. Illustrative of nucleating agents are sodium salts of monomeric, dimeric, trimeric and polymeric carboxylic acids and certain metal hydroxides. The composition may contain pigments. Examples of pigments that can be used are cadmium red, rhodamine, chrome yellow and chrome green.

The polymer composition of this invention can be prepared by blending the essential components and other optional components as desired, employing any convenient blending means. The metal iodide can be dissolved in a suitable solvent (for example water) and the red phosphorus stirred in, after which the solvent is flash evaporated thereby coating the particles of red phosphorus with the metal iodide. Other blending means as for example melt extrusion or dry mixing are well known in the art and will not be described herein in great detail. In the examples given hereinafter the metal iodide is carefully dried and ground prior to mixing or formulation in order to insure adequate distribution. Blending temperatures and pressures, and order of addition of the various components are not critical provided that a homogeneous composition results. The blending procedure can be carried out at elevated temperatures, in which case the meltable solid components are mixed by vigorously stirring the melt. Similarly, the various solid components can be granulated, and the granulated components mixed dry in a suitable blender, as for example a Branbury mixer, as uniformly as possible. The meltable components are then melted in an extruder and expressed with cooling.

The compositions of this invention are extremely fire retardant because of the red phosphorus component. Furthermore, these compositions are characterized by reduced evolution of phosphine during heat processing. The compositions according to the invention can be partially crystalline to amorphous, depending on which individual constituents are employed. They are thermoplastic materials from which molded articles of manufacture having valuable properties can be produced by the conventional shaping processes, such as casting, injection molding and extruding. Examples of such mouldings are components for technical equipment, apparatus castings, household equipment, sports equipment, components for the electrical and electronics industries and electrical insulations, car components, circuits, fibers and semi-finished products which can be shaped by machining. The use of the materials for coating processes is also possible, as is their use as hot-melt adhesives. The moulding compositions according to the invention are outstandingly suitable for specific applications of all types since their spectrum of properties can be modified in the desired direction in manifold ways.

The specific embodiments of the invention provided in the following examples are illustrative only and should not be construed as limitations to the scope of the invention.

EXAMPLES 1 AND 2 AND COMPARATIVE EXAMPLE 3

The following are examples of fire retardant, injection moldable polyester formulations. They contain:

1. Injection moldable poly(ethylene terephthalate) of intrinsic viscosity (IV) 0.5, melt compounded with the following additives (expressed in weight % by weight of PET) then extruded and pelleted.
50% Glass Fibers
6% Benzoflex ® Plasticizer*
6% Surlyn ® 1855 Impact Modifier**
1% Epoxy ECN 1299***

*Benzoflex ® 312 is neopentyldiol dibenzoate.
**Surlyn ® 1855 is a terpolymer of ethylene methacrylate in which part of the carboxylic functions are neutralized by zinc ions. It is described in the bulletin Surlyn Ionomer Resin E 1488 published by the DuPont Company.
***Epoxy ECN 1299 is a polyfunctional epoxy resin having about 3 epoxy groups per molecule. It is manufactured by Ciba-Geigy Corporation.

2. Exolit ® 361, a flame retardant containing 92% by weight of red phosphorus which has been stabilized and desensitized for ease of handling by an aluminum phosphonate. Exolit ® is manufactured by American Hoechst Corp.

3. Potassium iodide of commercial grade, dried and ground.

The pellets of the injection moldable poly(ethylene terephthalate) formulation described in 1 above were mixed with Exolit ® and potassium iodide in a Buchi/-Brinkman water bath evaporator. After thorough blending, the mixture was charged into an extruder, extruded at 275° C. as a monofilament and immediately chopped in a pelletizer. The pellets were dried overnight at 110° C. and stored for 18 hours in a sealed vessel. The phosphine measurements were taken with a Drager CH 31101 tube manufactured by Dragerwerk A. G. Lubeck. In accordance with this well known method, a sample was extracted from the gas in the storage container or from the immediate environment of the polymer processing apparatus (die), and phosphine concentration was measured by means of a colorimetric method based on the reduction of a complex gold salt to colloidal gold.

The percent composition of the tested samples and the corresponding concentration of phosphine measured at the die and in the sealed storage vessel in parts-per-million are shown in the following Table 1.

TABLE 1

| | Polymer | % Additive | | Phosphine Evolved PPM | |
| | | KI | Exolit ® | Die | Storage |
| --- | --- | --- | --- | --- | --- |
| Ex. 1 | Inj. Mold. PET | 0.6 | 4.0 | 0.3 | 1.0 |
| Ex. 2 Comp. | Inj. Mold. PET | 0.15 | 4.0 | 1.5 | 1.0 |

TABLE 1-continued

| | Polymer | % Additive | | Phosphine Evolved PPM | |
| --- | --- | --- | --- | --- | --- |
| | | KI | Exolit ® | Die | Storage |
| Ex. 3 | Inj. Mold. PET | — | 4.0 | 2.0 | 25.0 |

EXAMPLE 4

500 g PET of IV=0.95 were compounded with 30 g poly(ethylene oxide)—aluminum isopropoxide nucleating agent, 20 g red phosphorus and 2.5 g zinc iodide in a manner similar to that given for examples 1 through 3. The phosphine concentration produced at the die was 0.2 part-per-million.

EXAMPLE 5

500 g PET of IV=0.95 were compounded with 2.5 g lithium iodide and 20 g red phosphorus. Phosphine concentration produced at die was 0.2 ppm.

EXAMPLE 6

A composition similar to that of Example 5 and containing 30 g of poly(ethylene oxide)—aluminum isopropoxide as nucleator produced a phosphine concentration at the die of less than 0.1 ppm. The poly(ethylene oxide)—aluminum isopropoxide nucleator used in the foregoing examples can be substituted by 5 g crystalline aluminum hydroxide powder with equivalent effect.

EXAMPLE 7

500 g PET of IV=0.95 were compounded with 2.5 g sodium iodide and 20 g red phosphorus. Phosphine concentration produced at die was 0.2 ppm.

What is claimed is:

1. An improved, flame retarded polymer composition comprising:
   a. a saturated linear polyester of an aromatic dicarboxylic acid and an aliphatic or cycloaliphatic diol,
   b. red phosphorus as a flame retardant, and
   c. an effective amount of metal iodide as phosphine suppressant.

2. A composition according to claim 1 also comprising one or more components selected from the group of fillers, impact modifiers, chain extenders, colorants, nucleating agents, mold release agents, antioxidants, lubricants and UV light stabilizers.

3. A composition according to claim 1 or 2 wherein the polyester is a condensation product of a benzene based dicarboxylic acid having from 8 to 14 carbon atoms and an aliphatic or cycloaliphatic diol selected from the group of ethanediol, 1,4-butanediol, 1,3-propanediol, 1,4-cyclohexanediol and 1,4-cyclohexanedimethanol or mixtures or cocondensates thereof.

4. A composition according to claim 1 or 2 wherein the polyester is poly(ethylene terephthalate).

5. A composition according to claim 1 or 2 wherein the iodide contains one or more of the metals of group 1a and group 2b of the periodic table of elements.

6. A composition according to claim 1 or 2 wherein the metal iodide is selected from the group consisting of lithium iodide, sodium iodide, zinc iodide and potassium iodide.

7. A composition according to claim 6 wherein the metal iodide is potassium iodide.

8. A composition according to claim 5 wherein the metal iodide is present in an amount from about 0.1% to about 2% by weight based on the total weight of the composition.

9. A composition according to claim 2 wherein the filler is fiberglass.

* * * * *